United States Patent
Tojo

(10) Patent No.: US 12,553,530 B2
(45) Date of Patent: Feb. 17, 2026

(54) PRESSURE REGULATING VALVE WITH PISTON

(71) Applicant: MARUYAMA MFG. CO., INC., Tokyo (JP)

(72) Inventor: Nobuo Tojo, Tokyo (JP)

(*) Notice: Subject to any disclaimer, the term of this patent is extended or adjusted under 35 U.S.C. 154(b) by 146 days.

(21) Appl. No.: 18/632,286

(22) Filed: Apr. 11, 2024

(65) Prior Publication Data

US 2024/0369148 A1 Nov. 7, 2024

(30) Foreign Application Priority Data

May 1, 2023 (JP) .................... 2023-075562

(51) Int. Cl.
*F16K 17/30* (2006.01)

(52) U.S. Cl.
CPC .................... *F16K 17/30* (2013.01)

(58) Field of Classification Search
CPC . F16K 17/30; F16K 1/446; F16K 1/42; F16K 17/04; Y10T 137/7785; Y10T 137/5762; F16J 15/004; G05D 16/10; G05D 16/024
USPC ...................... 137/115.13; 251/359
See application file for complete search history.

(56) References Cited

U.S. PATENT DOCUMENTS

| | | | |
|---|---|---|---|
| 4,461,316 A * | 7/1984 | Cove | F16K 37/00 251/363 |
| 4,638,833 A * | 1/1987 | Wolcott, II | F16K 47/04 137/551 |
| 4,979,540 A | 12/1990 | Gavrila | |
| 5,031,509 A * | 7/1991 | Cowan | F15B 15/149 91/222 |
| 10,704,702 B2 * | 7/2020 | Al-Salam | F16K 25/04 |
| 2003/0070711 A1 * | 4/2003 | Bowman | F02M 21/0233 137/312 |
| 2015/0027557 A1 * | 1/2015 | Crawford | F16K 31/124 137/487.5 |

(Continued)

FOREIGN PATENT DOCUMENTS

| | | | | |
|---|---|---|---|---|
| DE | 3801561 A1 * | 8/1989 | | F16K 3/243 |
| DE | 4133188 | 4/1992 | | |

(Continued)

OTHER PUBLICATIONS

Extended Search Report in corresponding European Application No. 24171317.1, dated Oct. 1, 2024.

*Primary Examiner* — Jessica Cahill

(74) *Attorney, Agent, or Firm* — SHIPWAY IP

(57) ABSTRACT

A pressure regulating valve includes a body having a pressure regulating chamber into which a working liquid flows and an attachment hole fluidly coupling with the pressure regulating chamber, a valve seat assembly fitted in the attachment hole, wherein the valve seat assembly includes a surplus liquid discharge path fluidly coupled with the pressure regulating chamber, a piston configured to open and close an opening of the surplus liquid discharge path in the pressure regulating chamber, a valve seat seal forming a seal between the valve seat assembly and the body in the attachment hole in a liquid-tight manner and a return flow path fluidly coupling an inside of the attachment hole to the surplus liquid discharge path. Wherein the valve seat seal is located between the return flow path and the pressure regulating chamber.

20 Claims, 3 Drawing Sheets

(56) References Cited

U.S. PATENT DOCUMENTS

2016/0223089 A1* 8/2016 Nijland ................ F16K 27/045

FOREIGN PATENT DOCUMENTS

| JP | S59-175680 | 10/1984 |
| JP | S60-067471 | 5/1985 |

* cited by examiner

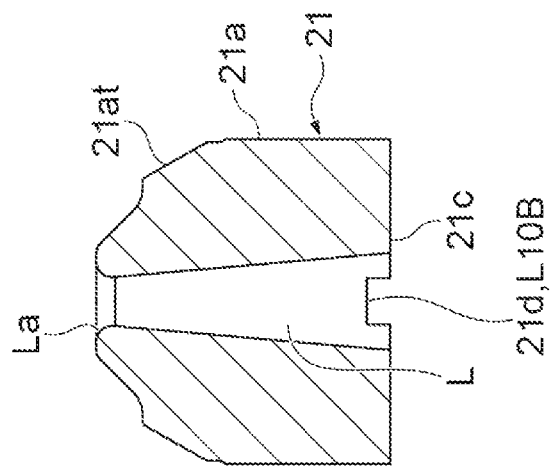
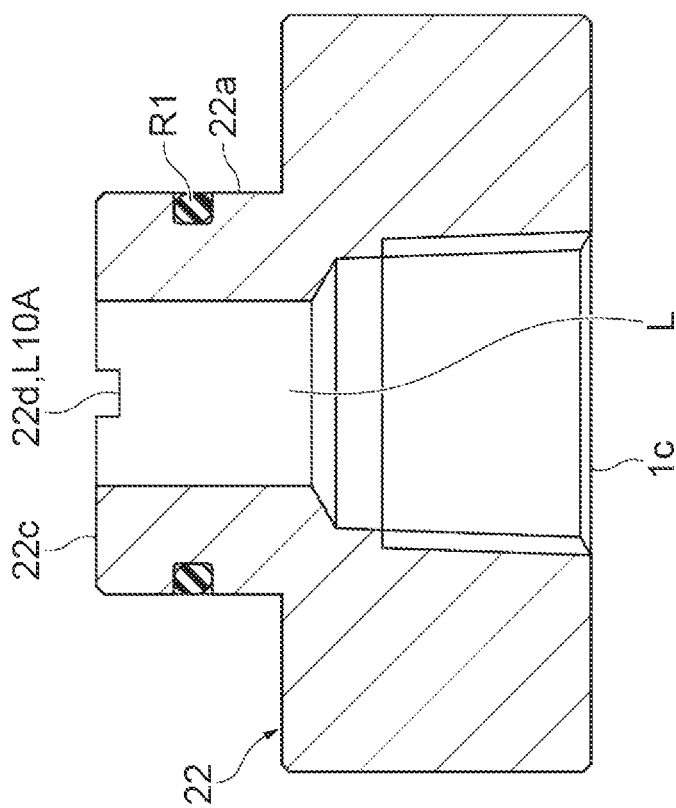
Fig.3A
Fig.3B

PRESSURE REGULATING VALVE WITH PISTON

CROSS-REFERENCE TO RELATED APPLICATIONS

This application is based upon and claims the benefit of priority from Japanese Patent Application No. 2023-075562, filed on May 1, 2023. The entire contents of which are incorporated herein by reference.

BACKGROUND

Field

The present disclosure relates to a pressure regulating valve that regulates the pressure of a working liquid.

Description of the Related Art

Japanese Unexamined Utility Model Publication No. S60-67471 describes a pressure regulating valve that regulates the pressure of an inflowing working liquid. The pressure regulating valve includes a valve seat unit that forms a surplus liquid discharge path for discharging a working liquid in the pressure regulating chamber, and a valve body that can sit on and separate from the valve seat unit.

SUMMARY

Disclosed herein is an example pressure regulating valve. The pressure regulating valve may be configured to regulate the pressure of a working liquid. The pressure regulating valve may include a body forming a pressure regulating chamber for regulating a pressure of an inflowing working liquid, an attachment hole provided in the body and communicating with the pressure regulating chamber, a valve seat assembly fitted in the attachment hole and forming a surplus liquid discharge path for discharging the working liquid in the pressure regulating chamber, and a piston valve body. The piston valve body includes a part positioned inside the pressure regulating chamber, and the piston valve body is configured to sit on the valve seat assembly to close an opening of the surplus liquid discharge path when the pressure of the working liquid is equal to or lower than a set pressure and separate from the valve seat assembly to open the opening when the pressure of the working liquid exceeds the set pressure. The pressure regulating valve may include a valve seat seal located in the attachment hole and positioned between the body and the valve seat assembly, and configured to seal in a liquid-tight manner between the body and the valve seat assembly. The valve seat assembly may include a return flow path opening provided in an outer peripheral surface of the valve seat assembly at a position facing an inner peripheral surface of the attachment hole, and a return flow path fluidly coupled the return flow path opening and the surplus liquid discharge path are formed in the valve seat assembly. The valve seat seal is located between the return flow path opening and the pressure regulating chamber between the body and the valve seat assembly.

The valve seat assembly includes the first return flow path fluidly coupling with the surplus liquid discharge path. The valve seat seal is located between the return flow path opening and the pressure regulating chamber. Even when the working liquid in the pressure regulating chamber enters the body and the valve seat assembly and leaks out from the valve seat seal, the leaked working liquid is discharged to the surplus liquid discharge path through the first return flow path. Accordingly, even when the working liquid leaks in the valve seat seal provided between the body and the valve seat assembly, it may suppress leakage of the working liquid to the outside from between the body and the valve seat assembly.

In some examples, the valve seat seal may have a metal seal structure in which the inner peripheral surface of the attachment hole of the body and the outer peripheral surface of the valve seat assembly are brought into surface contact with each other. The valve seat seal may include a tapered portion formed in a tapered shape on the inner peripheral surface of the attachment hole of the body and a tapered portion formed in a tapered shape on the outer peripheral surface of the valve seat assembly which is brought into surface contact with the tapered portion. The pressure regulating valve may seal the abutment portion between the body and the valve seat assembly without using another seal member such as an O-ring.

In some examples, the valve seat assembly may include a valve seat and an adapter provided adjacent to the valve seat. The surplus liquid discharge path may be formed by the valve seat and the adapter. The valve seat may include the opening of the surplus liquid discharge path opened and closed when the piston valve body is seated. The first return flow path may be formed in the adapter. The valve seat seal may be located between the body and the valve seat. Here, in the case of regulating the pressure of an ultra-high pressure working liquid, a portion of the valve seat assembly on which the valve body abuts may be required to have high hardness. The example valve seat assembly is configured using the valve seat and the adapter. This may allow the pressure regulating valve to form the valve seat assembly using a material having necessary characteristics at necessary portions.

In some examples, the first return flow path may include a valve seat groove of the valve seat, which is provided on an end surface abutting on the adapter. The return flow path may include an adapter groove of the adapter, which is provided on an end surface abutting on the valve seat. In the examples, the first return flow path can be readily formed by the groove provided in the valve seat and/or the adapter.

In some examples, the body may be provided with a guide hole configured to guide movement of the piston valve body when the piston valve body sits or separates. The pressure regulating valve may include a valve body seal sealing between an inner peripheral surface of the guide hole and an outer peripheral surface of the piston valve body in a liquid-tight manner, and a second return flow path connecting a guide hole opening provided on the inner peripheral surface of the guide hole and an attachment hole opening provided on the inner peripheral surface of the attachment hole. The valve body seal may be located between the guide hole opening and the pressure regulating chamber.

In some examples, a second return flow path formed by the body may be formed. The valve body seal is disposed between the guide hole opening and the pressure regulating chamber. Even when the working liquid in the pressure regulating chamber enters between the inner peripheral surface of the guide hole of the body and the outer peripheral surface of the piston valve body and leaks from the valve body seal, the leaked working liquid is discharged to the surplus liquid discharge path via the second return flow path. Thus, according to the examples, even when leakage of the working liquid occurs in the valve body seal provided between the guide hole of the body and the piston valve body, leakage of the working liquid to the outside from between the guide hole of the body and the piston valve body may be suppressed.

In some examples, the pressure regulating valve may further include a guide hole seal part disposed between the body and the piston valve body in the guide hole and sealing between the body and the piston valve body in a liquid-tight manner. The guide hole opening may be located between the guide hole seal part and the pressure regulating chamber.

In some examples, the pressure regulating valve may further include a second valve seat seal located between the body and the valve seat assembly in the attachment hole and sealing between the body and the valve seat assembly in a liquid-tight manner.

In some examples, the attachment hole opening may be disposed between the second valve seat seal and the pressure regulating chamber. The return flow path opening may be disposed between the second valve seat seal and the pressure regulating chamber.

In some examples the pressure regulating valve may further include a spring part configured to oppose the pressure of the working liquid in the pressure regulating chamber and bias the piston valve body in a direction of closing the opening.

In some examples, the pressure regulating valve may further include a spring cylinder connected to the body and housing a part of the piston valve body, and the spring part may include a plurality of disc springs housed in the spring cylinder.

In some examples the piston valve body may include a valve part configured to sit on the valve seat assembly, and a valve rod abutting on the valve part and biased by the spring part.

Additionally, an example pressure regulating valve is configured to adjust a pressure of a working liquid. The pressure regulating valve includes a body including a pressure regulating chamber into which the working liquid flows and an attachment hole communicating with the pressure regulating chamber, a valve seat assembly fitted in the attachment hole and attached to the body, the valve seat assembly including a surplus liquid discharge path fluidly coupled to the pressure regulating chamber, a piston valve body configured to open and close an opening of the surplus liquid discharge path in the pressure regulating chamber, a valve seat seal sealing between the valve seat assembly and the body in the attachment hole in a liquid-tight manner, and a return flow path fluidly connecting an inside of the attachment hole and the surplus liquid discharge path. The valve seat seal is disposed between the return flow path and the pressure regulating chamber.

The pressure regulating valve may further include a second valve seat seal sealing between the valve seat assembly and the body in the attachment hole in a liquid-tight manner, and the return flow path may be disposed between the valve seat seal and the second valve seat seal.

In some examples, the valve seat seal may include a seal surface formed on an outer peripheral surface of the valve seat assembly, and a seal receiving surface formed on an inner peripheral surface of the attachment hole and brought into surface contact with the seal surface.

BRIEF DESCRIPTION OF THE DRAWINGS

FIG. 3A is a longitudinal sectional view illustrating an example adapter.

FIG. 3B is a longitudinal sectional view illustrating an example valve seat.

DETAILED DESCRIPTION

Figure 1:
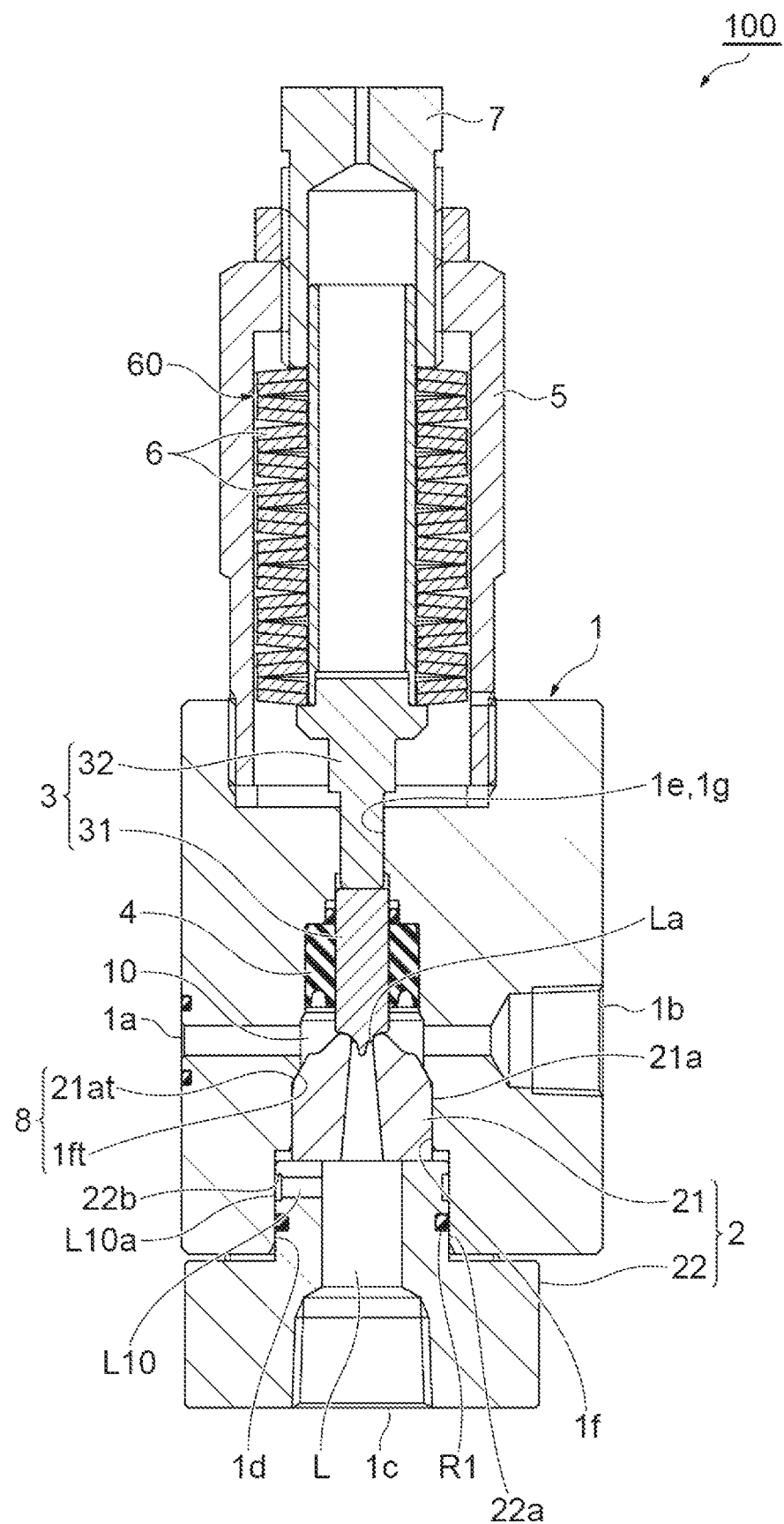
FIG. 1 is a longitudinal sectional view of an example pressure regulating valve.

In the following description, with reference to the drawings, the same reference numbers are assigned to the same components or to similar components having the same function, and overlapping description is omitted.

Hereinafter, phrases such as "upper" and "lower" are based on the state illustrated in the drawings and are for convenience in describing the configuration.

A pressure regulating valve 100 illustrated in FIG. 1 is a so-called differential pressure type pressure regulating valve. As an example, the pressure regulating valve 100 is used in a power sprayer, a cleaner, or the like that sprays a working liquid such as an agricultural chemical, a chemical liquid, a cleaning liquid, or a disinfectant. The pressure regulating valve 100 is attached to a discharge side of a pump that discharges the working liquid, and regulates the pressure of the working liquid discharged from the pump. In the following description, "communicate" means, for example, fluidly coupled.

The pressure regulating valve 100 includes a body 1, a valve seat assembly (e.g., a valve seat unit 2), a piston valve body 3, a valve body seal 4, a spring cylinder 5, a spring part 60, and a pressure regulating cap 7. The spring part 60 includes, for example, a plurality of disc springs 6. The spring part 60 may be another elastic body such as a coil spring.

An inlet 1a is formed in a side portion of the body 1. An outlet 1b is formed on a side portion of the body 1 opposite to the inlet 1a. A pressure regulating chamber 10 is formed in the body 1. The inlet 1a and the outlet 1b communicate with each other via the pressure regulating chamber 10. The pressure regulating chamber 10 is a chamber for regulating the pressure of the inflowing working liquid. The inlet 1a may be connected to a discharge port of a pump, and the outlet 1b may be connected to an injection nozzle via a pipe or the like.

An attachment hole 1d extending in up-down directions is formed in the lower surface of the body 1. The upper end of the attachment hole 1d communicates with the pressure regulating chamber 10. A guide hole 1e extending in the up-down directions is formed in the upper surface of the body 1. The lower end of the guide hole 1e communicates with the pressure regulating chamber 10. The guide hole 1e guides the movement of the piston valve body 3 when the piston valve body 3 sits on and separates from the valve seat unit 2.

The valve seat unit 2 has a cylindrical shape having an axis in the up-down directions. A cylinder hole of the valve seat unit 2 constitutes a surplus liquid discharge path L for discharging the working liquid in the pressure regulating chamber 10. The surplus liquid discharge path L communicates with the pressure regulating chamber 10. The valve seat unit 2 is fitted into the attachment hole 1d provided in the body 1 and attached to the body 1. An upper portion of the valve seat unit 2 is in the pressure regulating chamber 10. A lower end portion of the surplus liquid discharge path L serves as a surplus liquid port 1c for discharging the working liquid in the pressure regulating chamber 10 to the outside of the pressure regulating valve 100. The surplus liquid port 1c may be connected to a tank to which a pump is connected via a pipe or the like.

An upper portion of the piston valve body 3 opens and closes an opening La of the surplus liquid discharge path L in the pressure regulating chamber 10. The piston valve body 3 has a rod shape having an axis in the up-down directions, and is disposed coaxially with the valve seat unit 2. The piston valve body 3 is inserted into the guide hole 1e of the body 1 so as to be movable in the up-down directions. The piston valve body 3 may include a valve part 31 and a valve rod 32.

The valve part 31 is disposed below the valve rod 32. The valve part 31 is seated on an upper portion of the valve seat unit 2 from the upper side in the pressure regulating chamber 10. A part of the piston valve body 3 (the lower end of the valve unit 31) is in the pressure regulating chamber 10. In FIG. 1, a state in which the valve part 31 of the piston valve body 3 is seated on the valve seat unit 2 is illustrated.

A valve body seal 4 having an annular shape is provided between the outer peripheral surface of the valve part 31 and an inner peripheral surface 1g of the guide hole 1e. The valve body seal 4 seals between the outer peripheral surface of the valve part 31 and the inner peripheral surface 1g of the guide hole 1e in a liquid-tight manner. The valve part 31 is guided in the up-down directions by the guide hole 1e via the valve body seal 4. A high-pressure working liquid pressurized by a pump or the like flows into the pressure regulating chamber 10. Thus, for the valve body seal 4, one can withstand high pressure is used.

The valve rod 32 is disposed coaxially with the valve part 31. A lower end portion of the valve rod 32 abuts on an upper end portion of the valve part 31. A lower portion of the valve rod 32 has a columnar shape and is inserted into the guide hole 1e. An upper portion of the valve rod 32 receives a biasing force of the spring part 60 (e.g., the disc spring 6). The valve rod 32 functions as a spring receiver that receives the biasing force of the disc spring 6. A part of the valve rod 32 (a part of the piston valve body 3) is housed in the spring cylinder 5.

The spring cylinder 5 has a cylindrical shape having an axis in the up-down directions, and is disposed coaxially with the piston valve body 3 at a position of an upper portion of the body 1. The spring cylinder 5 is fixed to the body 1 by being screwed to the upper portion of the body 1.

The plurality of disc springs 6 oppose the pressure of the working liquid in the pressure regulating chamber 10 and bias the piston valve body 3 in a direction of closing the opening La. The plurality of disc springs 6 are stacked in the up-down directions in the cylinder hole of the spring cylinder 5. The plurality of disc springs 6 are disposed in a compressed state in the cylinder hole of the spring cylinder 5, and bias the valve rod 32 of the piston valve body 3 in the axial direction. This causes the valve part 31 of the piston valve body 3 to be biased in a direction of sitting on the valve seat unit 2. The valve rod 32 closes the opening La by covering the opening La of the surplus liquid discharge path L on the pressure regulating chamber 10 side. The biasing means for biasing the piston valve body 3 is not limited to the disc spring 6, and may be another member such as a compression coil spring.

When the pressure of the working liquid supplied from the inlet 1a to the pressure regulating chamber 10 is equal to or lower than a set pressure, the piston valve body 3 sits on the valve seat unit 2 so as to cover the opening La of the surplus liquid discharge path L provided in the valve seat unit 2, and closes the opening La.

On the other hand, when the pressure of the supplied working liquid exceeds the set pressure, the piston valve body 3 moves upward so as to compress the disc spring 6, and separates from the valve seat unit 2. This causes the piston valve body 3 to open the opening La of the surplus liquid discharge path L. In this manner, the pressure regulating valve 100 regulates the pressure of the working liquid by discharging a part of the working liquid to the outside through the surplus liquid discharge path L and the surplus liquid port 1c, and can discharge the working liquid with the regulated pressure from the outlet 1b.

The pressure regulating cap 7 is screwed to an upper portion of the spring cylinder 5. The lower end of the pressure regulating cap 7 abuts on an upper portion of the plurality of disc springs 6. Adjusting the position of the pressure regulating cap 7 in the up-down directions causes the initial load of the plurality of disc springs 6 disposed between the pressure regulating cap 7 and the valve rod 32 of the piston valve body 3 to be adjusted.

Next, details of the valve seat unit 2 will be described. The valve seat unit 2 includes a valve seat 21 and an adapter 22 provided adjacent to the valve seat 21. The adapter 22 is provided adjacent to the lower side of the valve seat 21. The surplus liquid discharge path L is formed of the valve seat 21 and the adapter 22. The surplus liquid discharge path L penetrates the valve seat 21 and the adapter 22 in the up-down directions. The opening La of the surplus liquid discharge path L is provided at the upper end of the valve seat 21. The valve part 31 of the piston valve body 3 sitting on and separating from the upper portion of the valve seat 21 causes the opening La of the surplus liquid discharge path L to open and close.

In the attachment hole 1d of the body 1, a valve seat seal 8 that seals between the body 1 and the valve seat unit 2 is provided between the body 1 and the valve seat unit 2 in a liquid-tight manner. The valve seat seal 8 may be located between the body 1 and the valve seat 21. The valve seat seal 8 may be located between the body 1 and the adapter 22. The valve seat seal 8 has a metal seal structure in which a first tapered portion (e.g., a tapered portion 1fi) formed in a tapered shape on an inner peripheral surface 1f of the attachment hole 1d of the body 1 and a second tapered portion (e.g., tapered portion 21at) formed in a tapered shape on an outer peripheral surface 21a of the valve seat 21 of the valve seat unit 2 are brought into surface contact with each other. The tapered portion 21 at is an example of a seal surface formed on an outer peripheral surface 22a of the valve seat unit 2. The tapered portion 1fi is an example of a seal receiving surface formed on the inner peripheral surface 1f of the attachment hole 1d and in surface contact with the tapered portion 21at.

The valve seat unit 2 is provided with a return flow path opening (e.g., an opening L10a) in the outer peripheral surface of the valve seat unit 2 at a position facing the inner peripheral surface 1f of the attachment hole 1d. In the valve seat unit 2, a return flow path (e.g., a first return flow path L10) connecting the opening L10a and the surplus liquid discharge path L is formed. The first return flow path L10 may be provided in the adapter 22. The first return flow path L10 may connect the opening L10a provided in the outer peripheral surface 22a of the adapter 22 at a position facing the inner peripheral surface 1f of the attachment hole 1d and the surplus liquid discharge path L. The first return flow path L10 extends along a direction orthogonal to the surplus liquid discharge path L. The first return flow path L10 may be provided in the valve seat 21.

An outer peripheral surface of the valve seat unit 2, for example, an outer peripheral surface 22a of the adapter 22 is provided with a catch flow path (e.g., a groove 22b) extending in a circumferential direction. The circumferential direction may mean a circumferential direction in a case where the valve seat unit 2 is assumed to have a cylindrical shape. The groove 22b is provided to annularly surround the surplus liquid discharge path L. The groove 22b may be provided without interruption over the entire circumference in the circumferential direction of the valve seat unit 2. The groove 20b passes through the position of the opening L10a of the first return flow path L10. The space formed by the inner peripheral surface 1f of the attachment hole 1d and the groove 22b communicates with the first return flow path L10 via the opening L10a. The working liquid that has leaked from the valve seat seal 8 is captured by the groove 22b and guided to the first return flow path L10.

Between the inner peripheral surface 1f of the attachment hole 1d of the body 1 and the outer peripheral surface of the valve seat unit 2 (the outer peripheral surface 21a of the valve seat 21), the valve seat seal 8 is positioned closer to the pressure regulating chamber 10 than the opening L10a of the first return flow path L10 on the outer peripheral surface 22a side of the adapter 22. The valve seat seal 8 may be located between the opening L10a and the pressure regulating chamber 10.

A second valve seat seal (e.g., an O-ring R1) is disposed between the body 1 and the valve seat unit 2 in the attachment hole 1d. The O-ring R1 seals between the body 1 and the valve seat unit 2 in a liquid-tight manner. An annular ring groove is formed in the outer peripheral surface 22a of the adapter 22 at a position facing the inner peripheral surface 1f of the attachment hole 1d. The O-ring R1 may be fitted into the ring groove. The first return flow path L10 is disposed between the valve seat seal 8 and the O-ring R1. The first return flow path L10 is provided such that the opening L10a of the first return flow path L10 on the outer peripheral surface 22a side of the adapter 22 is positioned closer to the valve seat seal 8 than the O-ring R1. Between the inner peripheral surface 1f of the attachment hole 1d of the body 1 and the outer peripheral surface of the valve seat unit 2, the opening L10a of the first return flow path L10 may be positioned between the valve seat seal 8 and the O-ring R1. When the O-ring R1 attached to the adapter 22 is brought into pressure contact with the inner peripheral surface 1f of the attachment hole 1d of the body 1, the adapter 22 is attached to the body 1 in a liquid-tight manner.

In this manner, the valve seat unit 2 of the pressure regulating valve 100 is provided with the first return flow path L10 communicating with the surplus liquid discharge path L. The valve seat seal 8 is disposed between the opening L10a provided on the outer peripheral surface 22a of the adapter 22 and the pressure regulating chamber 10. Even when the working liquid in the pressure regulating chamber 10 enters between the inner peripheral surface 1f of the attachment hole 1d of the body 1 and the outer peripheral surface of the valve seat unit 2 and leaks out from the valve seat seal 8, the leaked working liquid is discharged to the surplus liquid discharge path L through the first return flow path L10. In this manner, in the pressure regulating valve 100, even when the working liquid leaks in the valve seat seal 8 provided between the body 1 and the valve seat unit 2, it is possible to suppress leakage of the working liquid to the outside from between the body 1 and the valve seat unit 2.

The O-ring R1 is provided between the body 1 and the valve seat unit 2. The opening L10a of the first return flow path L10 is positioned closer to the valve seat seal 8 than the O-ring R1. The opening L10a may be located between the valve seat seal 8 and the O-ring R1. This allows the O-ring R1 to suppress leakage of the working liquid that has leaked from the valve seat seal 8 to the outside of the pressure regulating valve 100 from between the body 1 and the valve seat unit 2.

The pressure of the working liquid that has leaked from the valve seat seal 8 is lower than the pressure of the working liquid in the pressure regulating chamber 10. Thus, the O-ring R1 does not have to be configured to withstand high pressure like the valve seat seal 8. Thus, as the O-ring R1, an O-ring or the like having a simple configuration for low pressure can be adopted.

The O-ring R1 is not limited to being mounted in the ring groove provided in the outer peripheral surface 22a of the adapter 22. The O-ring R1 may be fitted into a ring groove provided in the inner peripheral surface 1f of the attachment hole 1d of the body 1.

The valve seat seal 8 includes a seal surface (e.g., the tapered portion 21at) formed on the outer peripheral surface (e.g., the outer peripheral surface 21a of the valve seat 21) of the valve seat assembly 2 and a seal receiving surface (e.g., the tapered portion 1ft) formed on the inner peripheral surface 1f of the attachment hole 1d and in surface contact with the seal surface. The valve seat seal 8 may have a metal seal structure in which the tapered portion 1ft of the body 1 and the tapered portion 21at of the valve seat 21 are brought into surface contact with each other. In this case, the pressure regulating valve 100 can seal the abutment portion between the body 1 and the valve seat unit 2 without using another seal member such as an O-ring.

The valve seat unit 2 includes the valve seat 21 and the adapter 22. The valve part 31 of the piston valve body 3 is seated on the valve seat 21. The adapter 22 is provided with the first return flow path L10. For example, in the case of regulating the pressure of an ultra-high pressure working liquid, a portion of the valve seat unit 2 on which the valve part 31 abuts may be required to have high hardness. The valve seat unit 2 of the pressure regulating valve 100 may include the valve seat 21 and the adapter 22 that are separate bodies. This may allow the pressure regulating valve 100 to form the valve seat unit 2 using a material having necessary characteristics at necessary portions. A material having a hardness higher than that of the adapter 22 can be used as a material forming the valve seat 21. In the pressure regulating valve 100, the first return flow path L10 may be readily formed with respect to the adapter 22 having a hardness lower than that of the valve seat 21.

Figure 2:
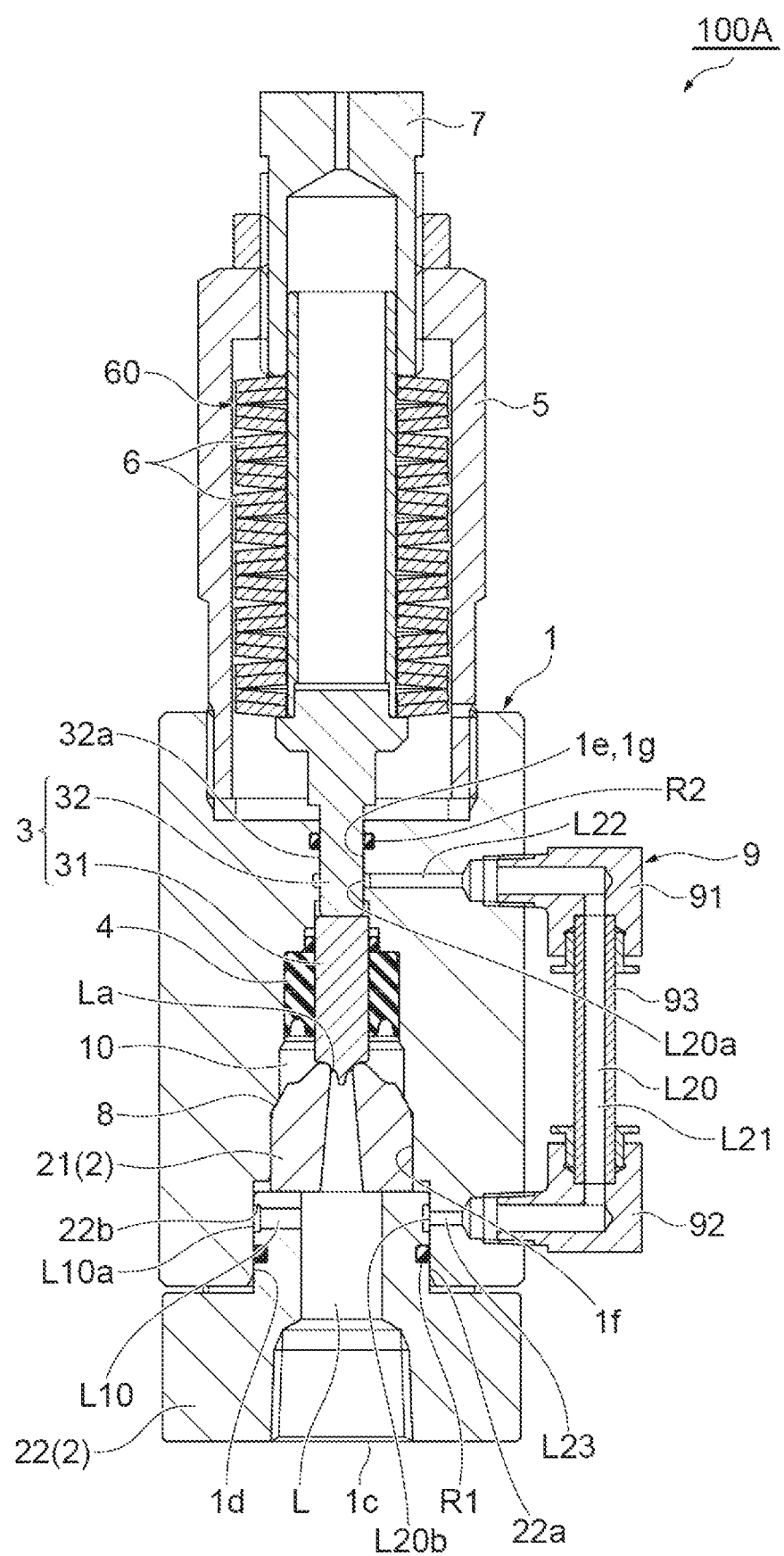
FIG. 2 is a longitudinal sectional view of another example pressure regulating valve.

Another example pressure regulating valve 100A will be illustrated in FIG. 2. FIG. 2 illustrates a section at an angle different from that in FIG. 1. Hereinafter, differences from the pressure regulating valve 100 illustrated in FIG. 1 will be mainly described. As illustrated in FIG. 2, a pressure regulating valve 100A is further provided with a second return flow path L20 as compared with the pressure regulating valve 100 illustrated in FIG. 1. Also in the pressure regulating valve 100A illustrated in FIG. 2, as in the pressure regulating valve 100 illustrated in FIG. 1, the inlet 1a and the outlet 1b communicating with the pressure regulating chamber 10 are provided at positions not illustrated.

The second return flow path L20 connects a guide hole opening (e.g., an opening L20a) provided on the inner peripheral surface 1g of the guide hole 1e of the body 1 and an attachment hole opening (e.g., an opening L20b) provided on the inner peripheral surface 1f of the attachment hole 1d of the body 1. At least a part of the second return flow path L20 is formed in the body 1. The pressure regulating valve 100A includes a flow path forming part 9 attached to the body 1. A flow path L21 extending from one end to the other end is formed inside the flow path forming part 9. In the present modification, the second return flow path L20 is formed by the body 1 and the flow path forming part 9.

The flow path forming part 9 includes a first socket 91, a second socket 92, and a pipe 93. The first socket 91 and the second socket 92 are attached to the body 1. The pipe 93 connects the first socket 91 and the second socket 92. The flow path L21 is formed by the first socket 91, the pipe 93, and the second socket 92.

The body 1 is provided with flow path holes L22 and L23. The flow path hole L22 extends from the inner peripheral surface 1g of the guide hole 1e of the body 1 toward the side surface of the body 1. The flow path hole L23 extends from the inner peripheral surface 1f of the attachment hole 1d of the body 1 toward the side surface of the body 1. The flow path hole L22 and the flow path L21 in the first socket 91 communicate with each other. The flow path hole L23 and the flow path L21 in the second socket 92 communicate with each other. The opening at the end of the flow path hole L22 on the inner peripheral surface 1g side of the guide hole 1e is the opening L20a at one end of the second return flow path L20. The opening at the end of the flow path hole L23 on the inner peripheral surface 1f side of the attachment hole 1d is the opening L20b of the other end of the second return flow path L20.

The valve body seal 4 is positioned closer to the pressure regulating chamber 10 than the opening L20a on the inner peripheral surface 1g side of the guide hole 1e in the second return flow path L20. The valve body seal 4 may be located between the opening L20a and the pressure regulating chamber 10. The inner peripheral surface 1g of the guide hole 1e of the body 1 is provided with a ring groove extending along the circumferential direction. A guide hole seal part (e.g., an O-ring R2) is fitted into a ring groove provided in the inner peripheral surface 1g. The O-ring R2 seals between an outer peripheral surface 32a of the valve rod 32 and the inner peripheral surface 1g of the guide hole 1e of the body 1 in a liquid-tight manner. The opening L20a is positioned closer to the pressure regulating chamber 10 (valve body seal 4) than to the O-ring R2. The opening L20a may be located between the O-ring R2 and the pressure regulating chamber 10. The opening L20b of the second return flow path L20 is positioned closer to the pressure regulating chamber 10 (valve seat seal 8) than the O-ring R1. The opening L20b may be disposed between the O-ring R1 and the pressure regulating chamber 10.

The outer peripheral surface 22a of the adapter 22 is provided with a catch flow path (e.g., the groove 22b) extending in the circumferential direction. The groove 22b may pass through the opening L10a of the first return flow path L10 and the opening L20b of the second return flow path L20. The space formed by the inner peripheral surface 1f of the attachment hole 1d and the groove 22b communicates with the first return flow path L10 via the opening L10a and communicates with the second return flow path L20 via the opening L20b.

The pressure regulating valve 100A includes the second return flow path L20 formed by the body 1 and the flow path forming part 9. The valve body seal 4 is positioned closer to the pressure regulating chamber 10 than the opening L20a on the inner peripheral surface 1g side of the guide hole 1e in the second return flow path L20. The valve body seal 4 is disposed between the opening L20a and the pressure regulating chamber 10. Thus, even when the working liquid in the pressure regulating chamber 10 leaks from the valve body seal 4, the leaked working liquid is guided to the attachment hole 1d side of the body 1 via the second return flow path L20. The first return flow path L10 is formed in the adapter 22 of the valve seat unit 2 fitted in the attachment hole 1d. Thus, the working liquid guided into the attachment hole 1d of the body 1 through the second return flow path L20 is discharged to the surplus liquid discharge path L through the first return flow path L10. The outer peripheral surface 22a of the adapter 22 is provided with a catch flow path (e.g., the groove 22b) extending in the circumferential direction. The working liquid guided into the attachment hole 1d of the body 1 through the second return flow path L20 is guided to the first return flow path L10 by the groove 22b.

In this manner, in the pressure regulating valve 100A, even when leakage of the working liquid occurs in the valve body seal 4 provided between the guide hole 1e of the body 1 and the piston valve body 3, leakage of the working liquid to the outside from between the guide hole 1e of the body 1 and the piston valve body 3 can be suppressed.

The O-ring R2 is provided between the body 1 and the piston valve body 3 (valve rod 32). The opening L20a of the second return flow path L20 is positioned closer to the valve body seal 4 than the O-ring R2. The opening L20a is disposed between the O-ring R2 and the valve body seal 4. This allows the O-ring R2 to suppress leakage of the working liquid that has leaked from the valve body seal 4 to the outside of the body 1 from between the guide hole 1e of the body 1 and the piston valve body 3.

The pressure of the working liquid that has leaked from the valve body seal 4 is lower than the pressure of the working liquid in the pressure regulating chamber 10. Thus, the O-ring R2 does not have to be configured to withstand high pressure like the valve body seal 4. Thus, as the O-ring R2, an O-ring or the like having a simple configuration for low pressure can be adopted.

The O-ring R2 is not limited to being fitted in the ring groove provided in the inner peripheral surface 1g of the guide hole 1e of the body 1. The O-ring may be mounted in a ring groove provided in the outer peripheral surface of the piston valve body 3 (the outer peripheral surface 32a of the valve rod 32).

The piston valve body 3 moves to regulate the pressure of the working liquid. Thus, liquid leakage is likely to occur from the valve body seal 4. In the pressure regulating valve 100A, since the working liquid that has leaked from the valve body seal 4 can be discharged to the surplus liquid discharge path L, liquid leakage from the valve body seal 4 can be allowed to some extent. This makes it possible to reduce the replacement frequency of the valve body seal 4 in the pressure regulating valve 100A.

It is to be understood that not all aspects, advantages and features described herein may necessarily be achieved by, or included in, any one particular example. Indeed, having described and illustrated various examples herein, it should be apparent that other examples may be modified in arrangement and detail. The first return flow path L10 may not limited to being formed by a hole provided in the adapter 22 of the valve seat unit 2. As illustrated in FIG. 3A, the first return flow path L10A may be formed by an adapter groove 22d provided in an upper end surface 22c of the adapter 22. The end surface 22c is a surface that abuts on the lower end surface of the valve seat 21. The adapter groove 22d (first return flow path L10A) extends from the outer peripheral surface 22a of the adapter 22 to the surplus liquid discharge path L. This forms the first return flow path L10A that connects a position in the outer peripheral surface of the valve seat unit 2 facing the inner peripheral surface 1f of the attachment hole 1d of the body 1 and the surplus liquid discharge path L in a state where the valve seat 21 abuts on the upper end surface 22c of the adapter 22.

In addition, as illustrated in FIG. 3B, the first return flow path L10B may be formed by a valve seat groove 21d provided on a lower end surface 21c of the valve seat 21. The end surface 21c is a surface that abuts on the upper end surface of the adapter 22. The valve seat groove 21d (first return flow path L10B) extends from the outer peripheral surface 21a of the valve seat 21 to the surplus liquid discharge path L. This forms the first return flow path L10B that connects a position in the outer peripheral surface of the valve seat unit 2 facing the inner peripheral surface 1f of the attachment hole 1d of the body 1 and the surplus liquid discharge path L in a state where the adapter 22 abuts on the lower end surface 21c of the valve seat 21.

The same effect as that in a case where the first return flow path L10 is provided may be obtained in a case where the first return flow paths L10A and L10B are provided instead of the first return flow path L10. In these modifications, the first return flow paths L10A and L10B can be readily formed by the valve seat groove 21d and the adapter groove 22d. The first return flow path L10A and the first return flow path L10B may be used simultaneously.

In some examples, the valve seat seal 8 may be formed of a metal seal structure. The valve seat seal is not limited to this configuration, and the valve seat seal 8 may be formed of a seal member.

Aspects of the present disclosure may be illustrated as follows.

A pressure regulating valve (100, 100A) include a body (1) having a pressure regulating chamber (10) into which working liquid flows and an attachment hole (1d) fluidly coupling with the pressure regulating chamber (10), a valve seat assembly (2) fitted in the attachment hole (1d), wherein the valve seat assembly includes a surplus liquid discharge path (L) fluidly coupled with the pressure regulating chamber (10), a piston valve body (3) configured to open and close an opening of the surplus liquid discharge path (L) in the pressure regulating chamber (10), a valve seat seal (8) sealing between the valve seat assembly (2) and the body (1) in the attachment hole (1d) in a liquid-tight manner, and a return flow path (L10) fluidly connecting an inside of the attachment hole (1d) and the surplus liquid discharge path (L). The valve seat seal (8) is located between the return flow path (L10) and the pressure regulating chamber (10).

The body (1) may include a guide hole (1e) configured to guide movement of the piston valve body (3) when the piston valve body (3) sits or separates. The pressure regulating valve (100, 100A) may include a valve body seal (4) sealing between an inner peripheral surface (1g) of the guide hole (1e) and an outer peripheral surface (32a) of the piston valve body (3) in a liquid-tight manner.

The pressure regulating valve (100, 100A) may include a second return flow path (L20) fluidly coupled with a guide hole opening (L20a) located on the inner peripheral surface (1g) of the guide hole (1e) and an attachment hole opening (L20b) located on the inner peripheral surface (If) of the attachment hole (1d).

The valve body seal (4) may be located between the guide hole opening (L20a) and the pressure regulating chamber (10).

The pressure regulating valve (100, 100A) may include a guide hole seal part (R2) located between the body (1) and the piston valve body (3) in the guide hole (1e) and sealing between the body (1) and the piston valve body (3) in a liquid-tight manner. The guide hole opening (L20a) may be located between the guide hole seal part (R2) and the pressure regulating chamber (10).

The pressure regulating valve (100, 100A) may include a second valve seat seal (R1) located between the body (1) and the valve seat assembly (2) in the attachment hole (1d) and sealing between the body (1) and the valve seat assembly (2) in a liquid-tight manner. The attachment hole opening (L20b) may be located between the second valve seat seal (R1) and the pressure regulating chamber (10).

The pressure regulating valve (100, 100A) may include a second valve seat seal (R1) located between the body (1) and the valve seat assembly (2) in the attachment hole (1d) and sealing between the body (1) and the valve seat assembly (2) in a liquid-tight manner. The return flow path opening (L10a) may be located between the second valve seat seal (R1) and the pressure regulating chamber (10).

The pressure regulating valve (100, 100A) may include a spring part (60) configured to oppose the pressure of the working liquid in the pressure regulating chamber (10) and bias the piston valve body (3) in a direction of closing the opening (La).

The pressure regulating valve (100, 100A) may include a spring cylinder (5) connected to the body (1) and housing a part of the piston valve body (3). The spring part (60) may include a plurality of disc springs (6) housed in the spring cylinder (5).

The piston valve body (3) may include a valve part (31) configured to sit on the valve seat assembly (2), and a valve rod (32) abutting on the valve part (31) and biased by the spring part (60).

The pressure regulating valve (100, 100A) may include a second valve seat seal (R1) sealing between the valve seat assembly (2) and the body (1) in the attachment hole (1d) in a liquid-tight manner. The return flow path (L10) is located between the valve seat seal (8) and the second valve seat seal (R2).

The valve seat seal (8) includes a seal surface (21at) formed on an outer peripheral surface (21a) of the valve seat assembly (2), and a seal receiving surface (1ft) formed on an inner peripheral surface (1f) of the attachment hole (1d) and brought into surface contact with the seal surface (21at).

What is claimed is:

1. A pressure regulating valve comprising:
   a body forming a pressure regulating chamber for regulating a pressure of a working liquid;
   an attachment hole provided in the body and fluidly coupled with the pressure regulating chamber;
   a valve seat assembly fitted in the attachment hole and forming a surplus liquid discharge path for discharging the working liquid in the pressure regulating chamber;
   a piston partially positioned inside the pressure regulating chamber, the piston configured to:
      contact the valve seat assembly in order to close an opening of the surplus liquid discharge path when the pressure of the working liquid is equal to or lower than a set pressure; and
      separate from the valve seat assembly in order to open the opening of the surplus liquid discharge path when the pressure of the working liquid exceeds the set pressure; and
   a valve seat seal located in the attachment hole and positioned between the body and the valve seat assembly, and configured to form a seal in a liquid-tight manner between the body and the valve seat assembly, wherein the valve seat assembly comprises:

a return flow path opening provided in an outer peripheral surface of the valve seat assembly at a position facing an inner peripheral surface of the attachment hole; and a return flow path fluidly coupling the return flow path opening and the surplus liquid discharge path, and wherein the valve seat seal is located between the return flow path opening and the pressure regulating chamber, and wherein the valve seat seal is located between the body and the valve seat assembly.

2. The pressure regulating valve according to claim 1, wherein the valve seat seal has a metal seal structure in which the inner peripheral surface of the attachment hole of the body and the outer peripheral surface of the valve seat assembly are brought into surface contact with each other.

3. The pressure regulating valve according to claim 1, wherein the valve seat seal includes a first tapered portion on the inner peripheral surface of the attachment hole of the body and a second tapered portion on the outer peripheral surface of the valve seat assembly which is brought into surface contact with the first tapered portion.

4. The pressure regulating valve according to claim 1,
wherein the valve seat assembly includes a valve seat and an adapter located adjacent to the valve seat, wherein the surplus liquid discharge path is formed by the valve seat and the adapter, and wherein the valve seat comprises the opening of the surplus liquid discharge path that is closed when the piston contacts the valve seat.

5. The pressure regulating valve according to claim 4, wherein the return flow path is formed in the adapter.

6. The pressure regulating valve according to claim 4, wherein the valve seat seal is located between the body and the valve seat.

7. The pressure regulating valve according to claim 4, wherein the return flow path comprises a valve seat groove of the valve seat, which is provided on an end surface abutting the adapter.

8. The pressure regulating valve according to claim 4, wherein the return flow path comprises an adapter groove of the adapter, which is located on an end surface abutting the valve seat.

9. A pressure regulating valve comprising:
a body including a pressure regulating chamber into which a working liquid flows and an attachment hole fluidly coupling with the pressure regulating chamber;
a valve seat assembly fitted in the attachment hole, wherein the valve seat assembly includes a surplus liquid discharge path fluidly coupled with the pressure regulating chamber;
a piston configured to open and close an opening of the surplus liquid discharge path in the pressure regulating chamber;
a valve seat seal forming a seal between the valve seat assembly and the body in the attachment hole in a liquid-tight manner; and
a return flow path fluidly coupling an inside of the attachment hole to the surplus liquid discharge path, wherein the valve seat seal is located between the return flow path and the pressure regulating chamber.

10. The pressure regulating valve according to claim 9, wherein the body comprises a guide hole configured to guide movement of the piston when the piston opens or closes the opening of the surplus liquid discharge path, and wherein the pressure regulating valve includes a valve body seal forming a seal between an inner peripheral surface of the guide hole and an outer peripheral surface of the piston in a liquid-tight manner.

11. The pressure regulating valve according to claim 10, further comprising a second return flow path fluidly coupling a guide hole opening located on the inner peripheral surface of the guide hole to an attachment hole opening located on the inner peripheral surface of the attachment hole.

12. The pressure regulating valve according to claim 11, wherein the valve body seal is located between the guide hole opening and the pressure regulating chamber.

13. The pressure regulating valve according to claim 12, further comprising a guide hole seal part forming a seal between the body and the piston in a liquid-tight manner, wherein the guide hole opening is located between the guide hole seal part and the pressure regulating chamber.

14. The pressure regulating valve according to claim 13, further comprising a second valve seat seal located between the body and the valve seat assembly in the attachment hole and forming a seal between the body and the valve seat assembly in a liquid-tight manner, wherein the attachment hole opening is located between the second valve seat seal and the pressure regulating chamber.

15. The pressure regulating valve according to claim 13, further comprising a second valve seat seal located between the body and the valve seat assembly in the attachment hole and forming a seal between the body and the valve seat assembly in a liquid-tight manner, wherein the valve seat assembly comprises a return flow path opening provided in an outer peripheral surface of the valve seat assembly at a position facing an inner peripheral surface of the attachment hole, and wherein the return flow path opening is located between the second valve seat seal and the pressure regulating chamber.

16. The pressure regulating valve according to claim 10, further comprising a second valve seat seal forming a seal between the valve seat assembly and the body in the attachment hole in a liquid-tight manner, wherein the return flow path is located between the valve seat seal and the second valve seat seal.

17. The pressure regulating valve according to claim 16, wherein the valve seat seal includes:
a seal surface formed on an outer peripheral surface of the valve seat assembly; and
a seal receiving surface formed on an inner peripheral surface of the attachment hole and brought into surface contact with the seal surface.

18. The pressure regulating valve according to claim 9, further comprising a spring part configured to oppose the pressure of the working liquid in the pressure regulating chamber and to bias the piston in a direction of closing the opening of the surplus liquid discharge path.

19. The pressure regulating valve according to claim 18, further comprising a spring cylinder connected to the body and housing a part of the piston, wherein the spring part includes a plurality of disc springs housed in the spring cylinder.

20. The pressure regulating valve according to claim 18, wherein the piston includes:
a valve part configured to sit on the valve seat assembly; and a valve rod abutting the valve part and biased by the spring part.

\* \* \* \* \*